Figure 1:
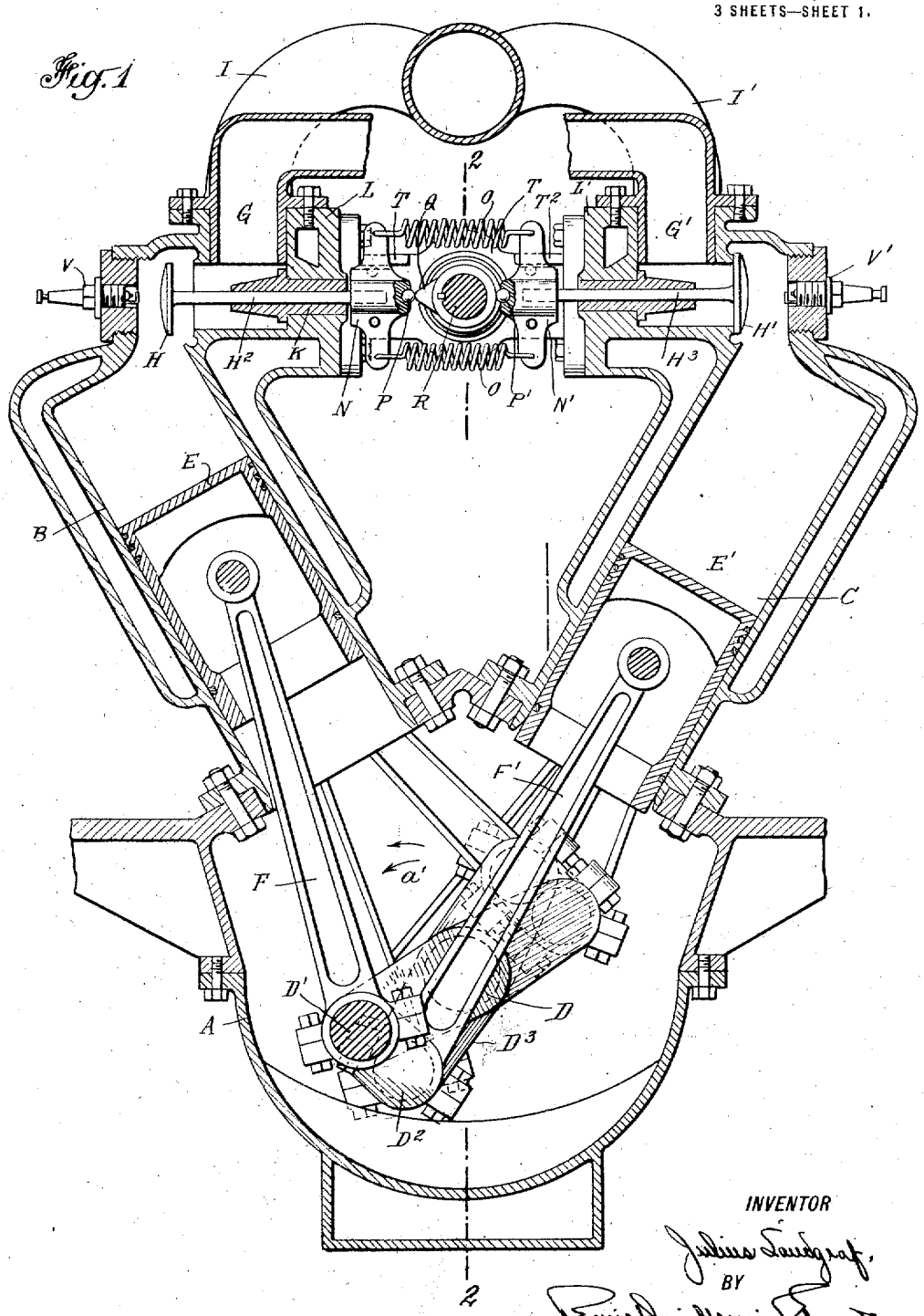

J. LANDGRAF.

INTERNAL COMBUSTION ENGINE.

APPLICATION FILED DEC. 14, 1917.

Reissued Jan. 4, 1921.

15,019.

3 SHEETS—SHEET 1.

INVENTOR

Julius Landgraf,

BY

Pennie, Davis, Marvin & Edmonds

ATTORNEYS

J. LANDGRAF.
INTERNAL COMBUSTION ENGINE.
APPLICATION FILED DEC. 14, 1917.
Reissued Jan. 4, 1921.
15,019.
3 SHEETS—SHEET 2.
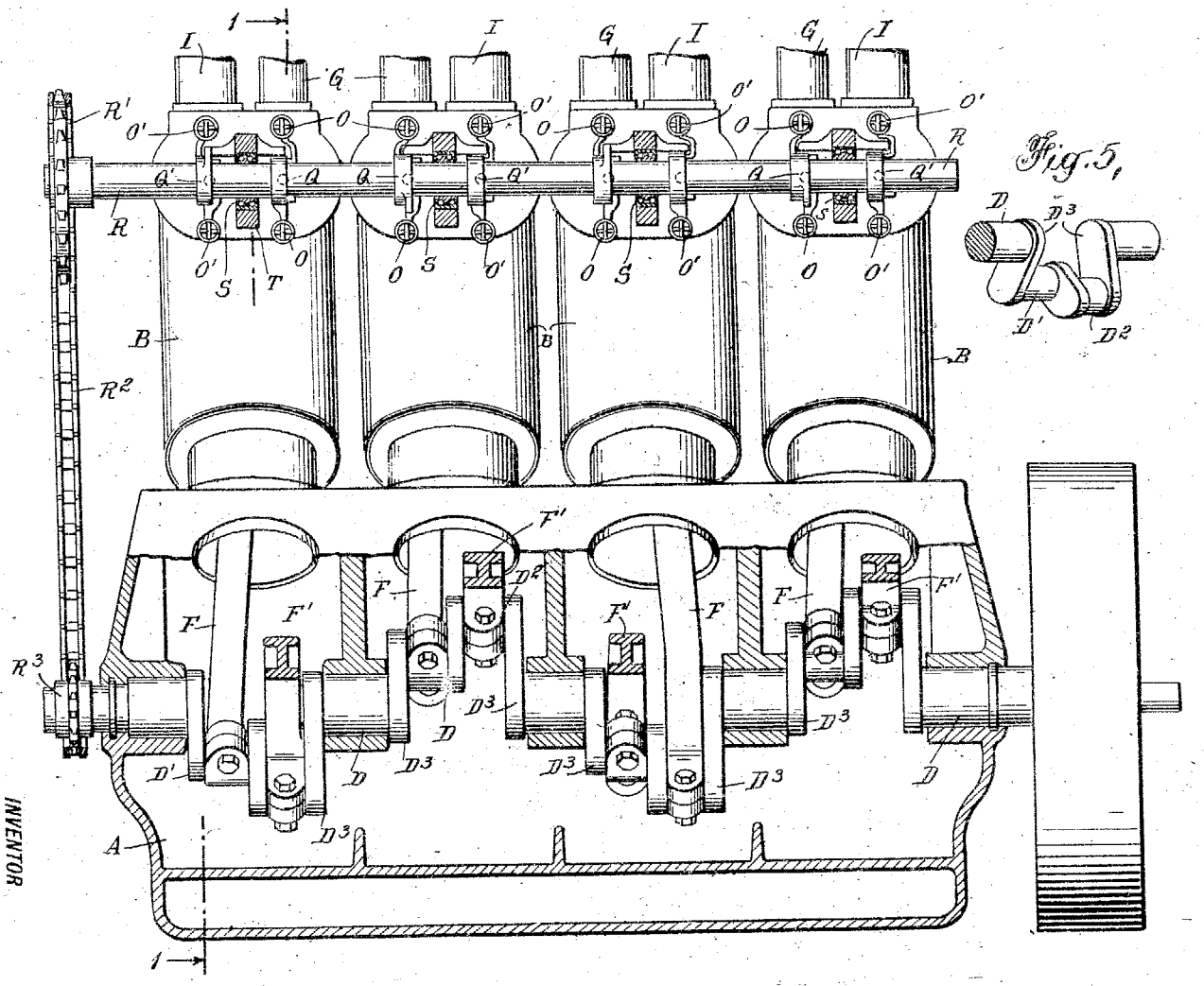

J. LANDGRAF.
INTERNAL COMBUSTION ENGINE.
APPLICATION FILED DEC. 14, 1917.
Reissued Jan. 4, 1921.
15,019.
3 SHEETS—SHEET 3.
Fig. 3,
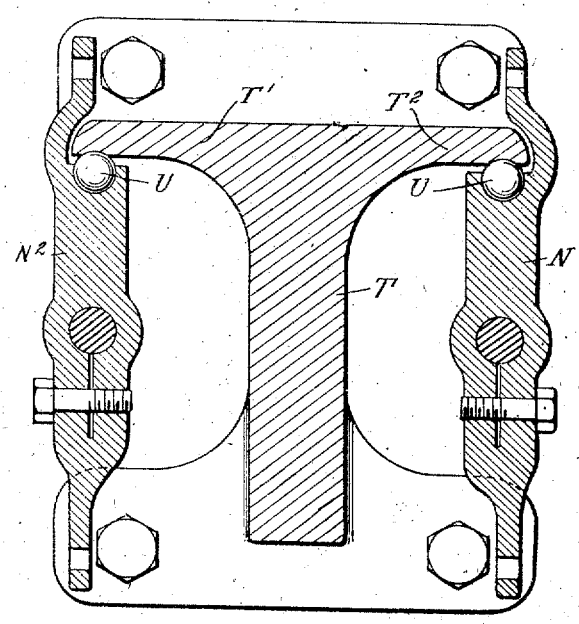
Fig. 6,
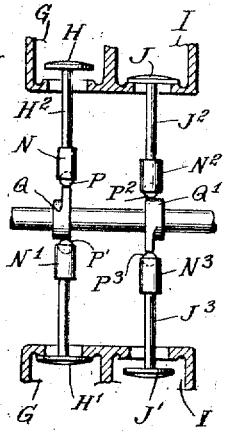
Fig. 4
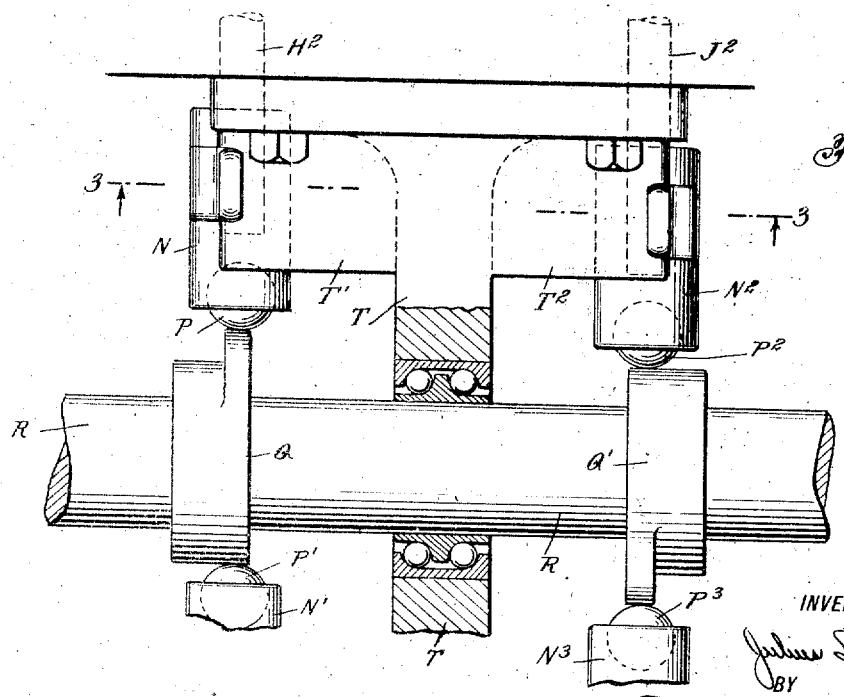
INVENTOR
Julius Landgraf,
BY
Pennie, Davis, Marvin & Emrich
ATTORNEYS.

UNITED STATES PATENT OFFICE.

JULIUS LANDGRAF, OF BRIARCLIFF MANOR, NEW YORK, ASSIGNOR TO THOMAS EVARTS ADAMS, OF ELMSFORD, NEW YORK.

INTERNAL-COMBUSTION ENGINE.

15,019. Specification of Reissued Letters Patent. Reissued Jan. 4, 1921.

Original No. 1,202,741, dated October 24, 1916, Serial No. 27,524, filed May 12, 1915. Application for reissue filed December 14, 1917. Serial No. 207,211.

*To all whom it may concern:*

Be it known that I, JULIUS LANDGRAF, a citizen of the United States, and a resident of Briarcliff Manor, in the county of Westchester and State of New York, have invented certain new and useful Improvements in Internal-Combustion Engines; and I hereby declare the following to be a full, clear, and exact description of the invention, such as will enable others skilled in the art to which it appertains to make and use the same.

The invention relates to motors of the multi-cylinder type, and its object is to provide a new and improved internal combustion engine arranged to reduce vibration to a minimum especially when running the engine at a high rate of speed, thus rendering the engine exceedingly serviceable for use on automobiles and other power-driven conveyances.

In order to produce the desired result, use is made of a crank shaft having crank arms each provided with two wrist pins, one slightly in advance of the other, pairs of converging cylinders disposed radially relatively to the axis of the crank shaft, pistons reciprocating in the said cylinders, and pitmen connecting the pistons of a pair of cylinders with the wrist pins of a corresponding crank arm. Use is also made of pairs of admission and exhaust valves for each pair of cylinders, the valves of a pair of cylinders having their stems in alinement and extending toward each other, the outer ends of the stems having heads adapted to be engaged alternately by a cam on a cam shaft driven from the crank shaft, and springs connecting the pairs of valves with each other.

A practical embodiment of the invention is represented in the accompanying drawings forming a part of this specification, in which similar characters of reference indicate corresponding parts in all the views.

Figure 1 is a cross section of the internal combustion engine on the line 1—1 of Fig. 2; Fig. 2 is a longitudinal central section of the same on the line 2—2 of Fig. 1; Fig. 3 is an enlarged sectional side elevation of the valve mechanism for a pair of cylinders, the section being on the line 3—3 of Fig. 4; Fig. 4 is a plan view of the same with part in section; Fig. 5 is a perspective view of a portion of the crank shaft provided with one of the crank arms having two wrist pins, one in advance of the other; and Fig. 6 is a diagrammatic plan view of the valve mechanism for a pair of cylinders.

On the crank case A of the internal combustion engine are mounted pairs of cylinders B and C, of which the cylinders of each pair converge and have their axes disposed radially relatively to the axis of the crank shaft D extending through the crank case A. In the cylinders B and C are mounted to reciprocate pistons E, E′ connected by pitmen F, F′ with wrist pins $D'$, $D^2$ on the crank arm $D^3$ forming part of the crank shaft D. The wrist pins $D'$ and $D^2$ for the pitmen F, F′ of each pair of cylinders are set one slightly in advance of the other, as plainly indicated in Figs. 1, 2 and 5, so that the pistons E and E′ reciprocate correspondingly in their cylinders B and C, as will be readily understood by reference to Fig. 1. The intakes G, G′ for each pair of cylinders B and C are controlled by admission valves H, H′, and the exhausts I and I′ for the pairs of cylinders B and C are controlled by exhaust valves J and J′.

The valve stems $H^2$, $H^3$ of the admission valves H, H′ extend toward each other and are mounted to slide in suitable bearings K, arranged on the chests L and L′ attached to or forming parts of the upper ends of the pair of cylinders B and C. The valve stems $J^2$ and $J^3$ of the exhaust valves J and J′ are similarly mounted and extend toward each other. The outer ends of the stems $H^2$, $H^3$ are attached to heads N, N′ and the stems $J^2$, $J^3$ are attached to heads $N^2$, $N^3$. The heads N and N′ are connected with each other by springs O, and similar springs O′ connect the heads $N^2$ and $N^3$ with each other. In the heads N and N′ are mounted balls P and P′ in engagement with the peripheral face of a cam Q mounted on a cam shaft R journaled in suitable bearings S arranged on brackets T connecting the chests L and L′ with each other. The heads $N^2$, $N^3$ are provided with balls $P^2$, $P^3$ in engagement with the peripheral face of a cam Q′ secured on the cam shaft R. The cams Q and Q′ extend in opposite directions, as plainly shown in Fig. 6, so that when the valves H and J′ are open, the valves H′ and J are closed, and when the valves H′ and J are open, the valves H and J′ are closed. Each bracket T is provided with bearings T′, T² engaged at the upper side by balls U, held on the corresponding heads N, N² and N′, N³, respectively, as will be readily understood by reference to Figs. 1, 3 and 4. One end of the cam shaft R (see Fig. 2) is provided with a sprocket wheel R′ connected by a sprocket chain R² with a sprocket wheel R³ secured on the crank shaft D so that when the latter makes two revolutions it imparts one revolution to the cam shaft R by the sprocket wheel and chain connection above described. The upper ends of the cylinders B and C are provided with the usual ignition devices V and V′ for igniting the explosive charges at the proper time.

The operation is as follows: When the engine is running the several valves, H, H′, J, J′ are opened and closed at the proper time by the action of cams Q and Q′ on balls P, P′, P², P³, of the corresponding heads N, N′, N², N³, it being understood that the balls are held in contact with the peripheral faces of the cams Q and Q′ by the action of the springs O. It will be noticed that when the engine is running the crank shaft D turns in the direction of the arrow *a*′, see Fig. 1, and when the crank shaft is in the position shown in the said figure then the admission valve H is open during the suction stroke of the piston E while the valve H′ is closed with the piston E′ on the power stroke, the piston E′ however, traveling ahead of the piston E owing to the wrist pin D² being ahead of the wrist pin D′. During the time the piston E is on the suction stroke, the valve J is closed and the valve J′ begins to open on the next return stroke of the piston E′ to cause the products of combustion to escape from the cylinder C. During the next return stroke of the piston E the valve H is closed to allow compression of the charge in the cylinder B, on the next following inward or power stroke the charge is ignited by the ignition device V, and on the following return stroke the valve J is opened to allow escape of the products of combustion from the cylinder B.

It will be seen that in the four cycle eight cylinder engine illustrated, the cylinders of each pair are displaced from each other about the engine shaft by an angle which is less than 90°, 90° being the angle comprised between the cylinders in the ordinary construction of engines of this type.

Generally speaking, in explosion engines of the multi-cylinder V-type, the angle between the cylinders of each pair must be equal to one or more circumferences divided by the number of cylinders in order that the explosions will occur at regular intervals, *i. e.*, in a four or eight-cylinder engine this angle is of 90°, in a six or twelve cylinder engine, 60° and so on.

By the arrangement shown, the angle between the cylinders may be reduced while maintaining the regularity in the succession of the explosions, and this result is attained by the fact that the wrist pins of each crank arm corresponding to a pair of cylinders are displaced from each other about the axis of the engine shaft by an angle which is equal to the difference between the angle which the cylinders of each pair should comprise according to the above stated rule, and the actual angle of displacement of said cylinders.

This reduction of the angular displacement of the cylinders is highly desirable as it causes a reduction of vibration, reduction of the size of the engine and reduction of the weight of the engine.

In the construction illustrated, the angle between the cylinders is 60° and consequently the angle between the wrist pins is 30°, but any other angle may be adopted for the displacement of the cylinders, provided that the angle between the wrist pins is accordingly modified so that its sum with the angle of the cylinders gives 90°.

In the same way a six or twelve cylinder engine may be constructed in which the angle of displacement of the cylinders has any desired value less than 60°, the wrist pins of each crank arm being displaced from each other by an angle which added to the angle comprised between the cylinders give 60°.

Having thus described my invention, I claim as new and desire to secure by Letters Patent:

1. An internal combustion engine, comprising a crank shaft having a crank arm provided with wrist pins one ahead of the other, a pair of converging cylinders having pistons connected with the said crank shaft horizontally disposed, admission and exhaust valves for the said cylinders and having their stems extending toward each other, and a cam shaft driven from the said crank shaft and extending between the cylinders of a pair of cylinders, and cams on the said cam shaft, one for opening the admission valve of one cylinder while the admission valve of the other cylinder is closed, and one cam for opening the exhaust valve of the other cylinder while the exhaust valve of the first cylinder is closed.

2. In an internal combustion engine, the combination of a crank case, pairs of converging cylinders mounted on the said crank case and provided at their outer ends with horizontally disposed valve chests projecting toward each other, a bracket connecting the chests of a pair of cylinders with each other, a crank shaft journaled in the crank case, pistons reciprocating in the said cylinders, pitmen connecting the said pistons with the crank shaft, admission and exhaust valves in each chest, a cam shaft journaled in the said bracket and controlling the said valves, and means for driving the same cam shaft from the said crank shaft.

3. An internal combustion engine, comprising a pair of cylinders each having an admission and an exhaust valve, the stems of the valves of the two cylinders extending toward each other, a head on the outer end of each valve stem, springs connecting oppositely disposed heads with each other, and a cam shaft intermediate the opposite valve stem heads and provided with cams, one for controlling the admission valves and the other the exhaust valves.

4. An internal combustion engine, comprising a pair of cylinders each having an admission and an exhaust valve, the stems of the valves of the two cylinders extending toward each other, a head on the outer end of each valve stem, springs connecting oppositely disposed heads with each other, balls in the said heads, and a cam shaft having cams engaged by the said balls.

5. An internal combustion engine, comprising a pair of cylinders each having an admission and an exhaust valve, the stems of the valves of the two cylinders extending toward each other, a head on the outer end of each valve stem, springs connecting oppositely disposed heads with each other, means for guiding the said heads, and a cam shaft intermediate the opposite valve stem heads and provided with cams, one for controlling the admission valves and the other the exhaust valves.

6. A multi-cylinder, V-type, internal combustion engine comprising the combination of a plurality of pairs of cylinders having the cylinders of each pair displaced angularly about the axis of the engine shaft by an angle which is smaller than the number of circumferences in which a cycle of the engine is completed divided by the number of cylinders in the engine, an integral crankshaft having a plurality of crank-arms, one for each pair of cylinders, arranged at equal intervals to each other and having each crank-arm provided with two wrist-pins which are displaced from each other about the axis of the engine shaft by an angle which together with the angle of displacement of the cylinders of each pair equals an angle not exceeding 90° and corresponding to the number of circumferences in which a cycle of the engine is completed divided by the number of cylinders, pistons in the cylinders and connecting rods connecting the pistons to the wrist-pins.

7. A multi-cylinder, V-type, internal combustion engine comprising the combination of a plurality of pairs of cylinders having the cylinders of each pair displaced angularly about the axis of the engine shaft by an angle which is smaller than the number of circumferences in which a cycle of the engine is completed divided by the number of cylinders in the engine, an integral crankshaft having a crank-arm for each pair of cylinders and having each crank-arm provided with two wrist-pins which are displaced from each other about the axis of the engine shaft by an angle which is less than the angle between the cylinders of a pair and which together with the angle of displacement of the cylinders of each pair equals an angle corresponding to the number of circumferences in which a cycle of the engine is completed divided by the number of cylinders, pistons in the cylinders and connecting rods connecting the pistons to the wrist-pins.

8. In a motor, in combination, eight cylinders arranged in two sets of four each, the sets being disposed in V form with the axes of the cylinders of one set at an angle of less than 90° to those of the other set, and a crank shaft having a set of crank pins for each set of cylinders, the crank pins of one set being offset angularly relatively to those of the other set to the same extent as the axes of the cylinder sets are less than 90° apart.

9. A multi-cylinder, V-type, internal combustion engine comprising the combination of a plurality of pairs of cylinders having the cylinders of each pair displaced angularly about the axis of the engine shaft by an angle which is smaller than the number of circumferences in which a cycle of the engine is completed divided by the number of cylinders in the engine, an integral crankshaft having a single integral crank-arm for each pair of cylinders and having each crank-arm provided with two wrist-pins which are displaced from each other about the axis of the engine shaft by an angle which is less than 90° and is different from the angle between the cylinders of a pair and which together with the angle of displacement of the cylinders of each pair equals an angle corresponding to the number of circumferences in which a cycle of the engine is completed divided by the number of cylinders, pistons in the cylinders and connecting rods connecting the pistons to the wrist-pins.

In testimony whereof I affix my signature.

JULIUS LANDGRAF.